(12) United States Patent
Yoshida et al.

(10) Patent No.: US 11,469,405 B2
(45) Date of Patent: *Oct. 11, 2022

(54) METHOD FOR MANUFACTURING ELECTRODE FOR SECONDARY BATTERY AND METHOD FOR MANUFACTURING SECONDARY BATTERY

(71) Applicant: NEC CORPORATION, Tokyo (JP)

(72) Inventors: Noboru Yoshida, Tokyo (JP); Makihiro Otohata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 16/766,358

(22) PCT Filed: Nov. 13, 2018

(86) PCT No.: PCT/JP2018/041942
§ 371 (c)(1),
(2) Date: May 22, 2020

(87) PCT Pub. No.: WO2019/102900
PCT Pub. Date: May 31, 2019

(65) Prior Publication Data
US 2020/0381698 A1    Dec. 3, 2020

(30) Foreign Application Priority Data
Nov. 24, 2017  (JP) ............................. JP2017-225668

(51) Int. Cl.
*H01M 4/04*      (2006.01)
*H01M 10/058*    (2010.01)
(Continued)

(52) U.S. Cl.
CPC ......... *H01M 4/0404* (2013.01); *H01M 4/131* (2013.01); *H01M 4/1391* (2013.01);
(Continued)

(58) Field of Classification Search
CPC .. H01M 4/0404; H01M 4/131; H01M 4/1391; H01M 4/505; H01M 4/525;
(Continued)

(56) References Cited

U.S. PATENT DOCUMENTS

| | | | |
|---|---|---|---|
| 2005/0186474 A1* | 8/2005 | Jiang ..................... | H01M 4/525 429/209 |
| 2015/0270523 A1* | 9/2015 | Toyoda ............... | H01M 50/403 427/58 |

FOREIGN PATENT DOCUMENTS

| | | |
|---|---|---|
| JP | 09-223499 A | 8/1997 |
| JP | 11-025956 A | 1/1999 |

(Continued)

OTHER PUBLICATIONS

JP2000331675 MT (Year: 2000).*

(Continued)

*Primary Examiner* — Alexander Usyatinsky
(74) *Attorney, Agent, or Firm* — Sughrue Mion, PLLC

(57) ABSTRACT

A method for manufacturing an electrode for a secondary battery includes: applying a first layer slurry containing a first binder to a surface of a current collector, applying a second layer slurry containing a second binder on the first layer slurry before the first layer slurry is dried, and drying the first layer slurry and the second layer slurry after applying the first layer slurry and the second layer slurry to obtain a laminated structure in which a first layer and a second layer are laminated in this order on the current collector. The second layer slurry has a solid content ratio of more than 50% by mass and a composition ratio of the second binder of more than 2% by mass.

12 Claims, 8 Drawing Sheets

(51) Int. Cl.
*H01M 4/131* (2010.01)
*H01M 4/1391* (2010.01)
*H01M 4/505* (2010.01)
*H01M 4/525* (2010.01)
*H01M 4/62* (2006.01)
*H01M 10/0525* (2010.01)
*H01M 10/0566* (2010.01)

(52) U.S. Cl.
CPC ........... *H01M 4/505* (2013.01); *H01M 4/525* (2013.01); *H01M 4/623* (2013.01); *H01M 10/058* (2013.01); *H01M 10/0525* (2013.01); *H01M 10/0566* (2013.01); *H01M 2300/0028* (2013.01)

(58) Field of Classification Search
CPC ............... H01M 4/623; H01M 10/058; H01M 10/0525; H01M 10/0566; H01M 2300/0028
See application file for complete search history.

(56) References Cited

FOREIGN PATENT DOCUMENTS

| | | | |
|---|---|---|---|
| JP | 11-339772 | A | 12/1999 |
| JP | 2000-123823 | A | 4/2000 |
| JP | 2000-331675 | A | 11/2000 |
| JP | 2000331675 | * | 11/2000 |
| JP | 2004-199916 | A | 7/2004 |
| JP | 3622383 | B2 | 2/2005 |
| JP | 2008-034215 | A | 2/2008 |
| JP | 2008034215 | * | 2/2008 |
| JP | 2008-123988 | A | 5/2008 |
| JP | 200812398 | * | 5/2008 |
| JP | 2009-032427 | A | 2/2009 |
| JP | 2010-282873 | A | 12/2010 |
| JP | 2011-159407 | A | 8/2011 |
| JP | 2013-109931 | A | 6/2013 |
| JP | 2016-042467 | A | 3/2016 |
| JP | 2016-072026 | A | 5/2016 |
| JP | 2017-212088 | A | 11/2017 |
| WO | 2012/128160 | A1 | 9/2012 |
| WO | 2014/162437 | A1 | 10/2014 |

OTHER PUBLICATIONS

2019555268,Decision_to_Grant_a_Patent_(Translated), Nov. 2, 2021 (Year: 2021).*
Japanese Office Communication for JP Application No. 2019-555268 dated Nov. 2, 2021 with English Translation.
Kyoichi Saito, "JP2000331675—Manufacture of Secondary Battery Electrode and Manufacture of Secondary Battery", Translation, original published 2000, translated via Google Apr. 28, 2020 (Year:2000), total 13 pages.
Office Action dated Jun. 2, 2020 from the United States Patent and Trademark Office in U.S. Appl. No. 16/188,522.
International Search Report for PCT/JP2018/041942 dated Feb. 19, 2019 [PCT/ISA/210].
Japanese Office Action for JP Application No. 2017-225638 dated Oct. 26, 2021 with English Translation.
Japanese Office Action for JP Application No. 2019-555268 dated May 18, 2021 with English Translation.

* cited by examiner

METHOD FOR MANUFACTURING ELECTRODE FOR SECONDARY BATTERY AND METHOD FOR MANUFACTURING SECONDARY BATTERY

CROSS REFERENCE TO RELATED APPLICATIONS

This application is a National Stage of International Application No. PCT/JP2018/041942 filed Nov. 13, 2018, claiming priority based on Japanese Patent Application No. 2017-225668 filed Nov. 24, 2017.

TECHNICAL FIELD

The present invention relates to a method for manufacturing an electrode used as a positive electrode and a negative electrode of a secondary battery.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode. Conventionally, a polyolefin-based microporous separator made of polypropylene or polyethylene material is mainly used as the separator. However, the melting points of polypropylene and polyethylene materials are generally 110° C. to 160° C. Therefore, when a polyolefin-based separator is used for a battery with a high energy density, the separator melts at a high temperature of the battery, and a short circuit may occur between the electrodes in a large area, which cause smoke and ignition of the battery.

Therefore, in order to improve the safety of the secondary battery, the following techniques are known. Patent Literature 1 (Japanese Patent No. 3622383) describes a technique for manufacturing an electrode of a secondary battery having a structure in which a current collector, an electrode material layer, and a protective layer are laminated by simultaneously applying coating liquids for the electrode material layer and the protective layer on the current collector and drying the coating liquids.

CITATION LIST

Patent Literature

Patent Literature 1: Japanese Patent No. 3622383

SUMMARY OF INVENTION

Technical Problem

However, in the technique described in Patent Literature 1, since the coating liquid for the insulating layer is applied before the coating liquid for the active material layer is dried, both coating liquids are mixed in the vicinity of the interface between the active material layer and the insulating layer, and the active material layer and the insulating layer form a mixed portion at the interface. Local mixing of both layers is desirable for improving the adhesion of both layers. However, significant mixing may cause a decrease in charge/discharge capacity, an increase in battery resistance, a decrease in insulation effect, and the like.

It is an object of the present invention to provide a method for manufacturing an electrode for a secondary battery which is manufactured without deteriorating battery characteristics when used in a battery while suppressing mixing of a first and a second layers when the second layer is applied before drying the first layer when manufacturing the electrode for the secondary battery in which the first layer and the second layer are laminated on the current collector, and a method for manufacturing the secondary battery.

Solution to Problem

A method for manufacturing an electrode used as a positive electrode and a negative electrode of a secondary battery according to the present invention comprises:

applying a first layer slurry containing a first binder to a surface of a current collector, applying a second layer slurry containing a second binder on the first layer slurry before the first layer slurry is dried, and drying the first layer slurry and the second layer slurry after applying the first layer slurry and the second layer slurry to obtain a laminated structure in which a first layer and a second layer are laminated in this order on the current collector, wherein the second layer slurry has a solid content ratio of more than 50% by mass and a composition ratio of the second binder of more than 2% by mass.

Definition of Terms

Generally, a slurry contains a filler, a binder for binding the filler, and a solvent for those. In the present invention, when the mass of the filler contained in the slurry is A, the mass of the binder is B, and the mass of the solvent is C, "solid content ratio" means a value calculated by $(A+B)/(A+B+C)$, and "composition ratio of binder" means a value calculated by $B/(A+B)$.

Advantageous Effects of Invention

According to the present invention, an electrode having a structure in which a first layer and a second layer are laminated on a current collector can be efficiently manufactured without deteriorating battery characteristics when used as a battery while suppressing mixing the interface between the first and the second layers when the second layer is formed by coating before drying the first layer.

DESCRIPTION OF EMBODIMENTS

Figure 1:
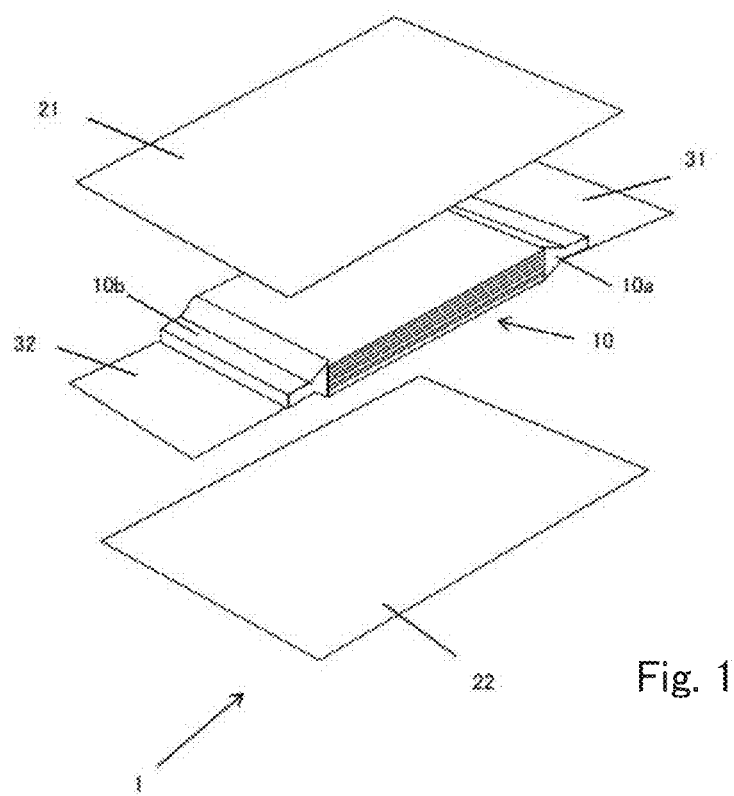
FIG. 1 is an exploded perspective view of a secondary battery according to one embodiment of the present invention.

Referring to FIG. 1, an exploded perspective view of a secondary battery 1 according to one embodiment of the present invention is shown, which comprises a battery element 10 and a casing enclosing the battery element 10 together with an electrolytic solution. The casing has casing members 21, 22 that enclose the battery element 10 from both sides in the thickness direction thereof and seal outer circumferential portions thereof to thereby seal the battery element 10 and the electrolytic solution. A positive electrode terminal 31 and a negative electrode terminal 32 are respectively connected to the battery element 10 with protruding part of them from the casing.

Figure 2:
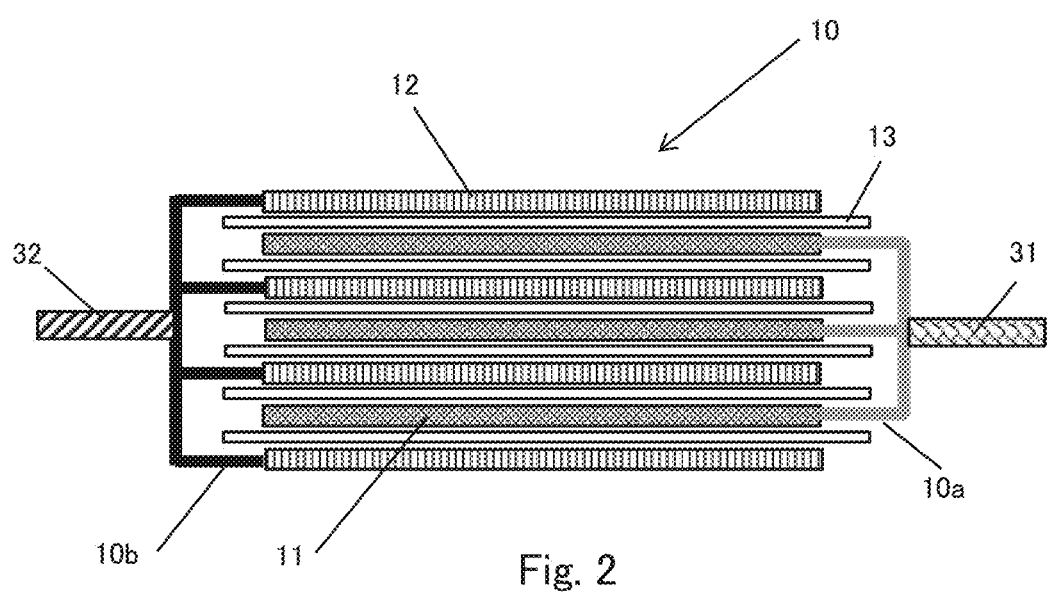
FIG. 2 is a schematic sectional view of a battery element shown in FIG. 1.

As shown in FIG. 2, the battery element 10 has a configuration in which a plurality of positive electrodes 11 and a plurality of negative electrodes 12 are disposed to face each other so as to be alternately positioned. In addition, a separator 13 is disposed between the positive electrode 11 and the negative electrode 12 to ensure ion conduction between the positive electrode 11 and the negative electrode 12 and to prevent a short circuit between the positive electrode 11 and the negative electrode 12. However, the separator 13 is not essential in the present embodiment.

Figure 3:
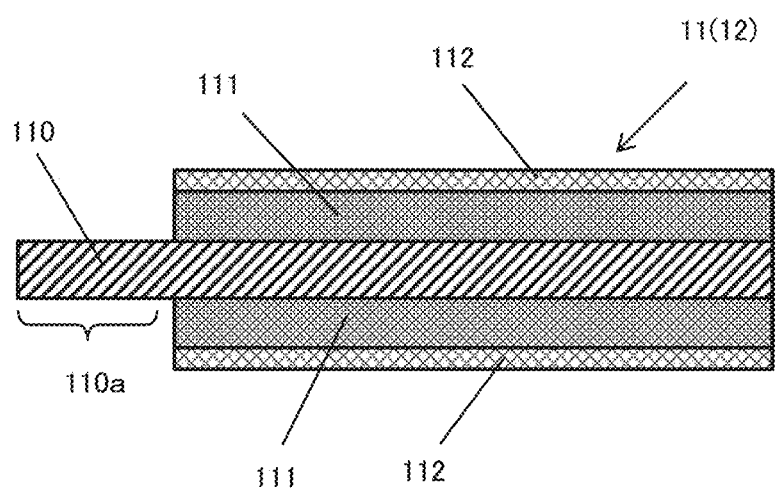
FIG. 3 is a schematic sectional view showing the configuration of a positive electrode and a negative electrode shown in FIG. 2.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. The positive electrode 11 and the negative electrode 12 (collectively referred to as "electrode" in a case where these are not distinguished) include a current collector 110 which can be formed of a metal foil, an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

The extended portion 110a of the positive electrode 11 and the extended portion 110a of the negative electrode 12 are formed at positions not overlapping each other in a state where the positive electrode 11 and the negative electrode 12 are laminated. However, the extension portions 110a of the positive electrodes 11 are positioned to overlap with each other, and the extension portions 110a of the negative electrodes 12 are also similar to each other. With such arrangement of the extended portions 110a, in each of the plurality of positive electrodes 11, the respective extended portions 110a are collected and welded together to form a positive electrode tab 10a. Likewise, in the plurality of negative electrodes 12, the respective extended portions 110a are collected and welded together to form a negative electrode tab 10b. A positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed in a region where the active material layer 111 is not exposed in plan view and may be formed so as to cover a part of the extended portion 110a. In the case where the active material layer 111 is formed on both surfaces of the current collector 110, the insulating layer 112 may be formed on both the active material layers 111 or only on one of the active material layers 111.

Figure 4A:
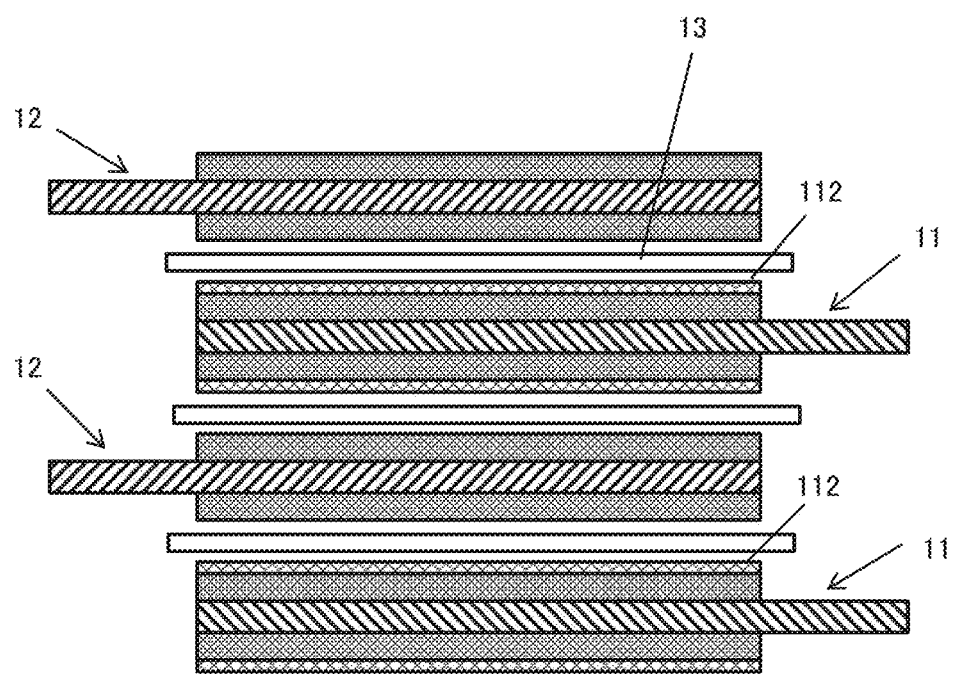
FIG. 4A is a sectional view showing an example of arrangement of the positive electrode and the negative electrode in the battery element.
Figure 4B:
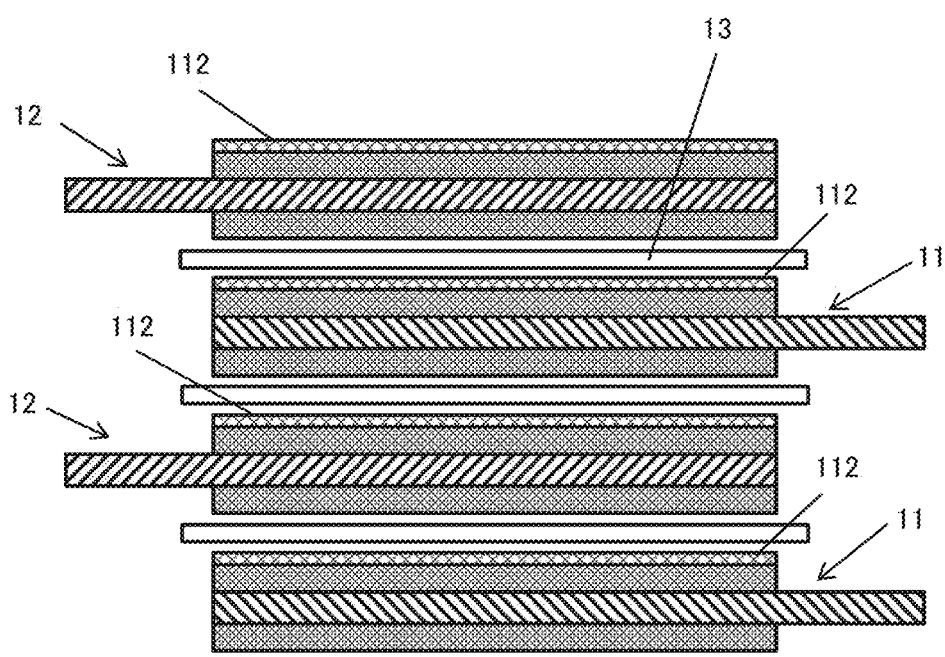
FIG. 4B is a sectional view showing another example of arrangement of the positive electrode and the negative electrode in the battery element.
Figure 4C:
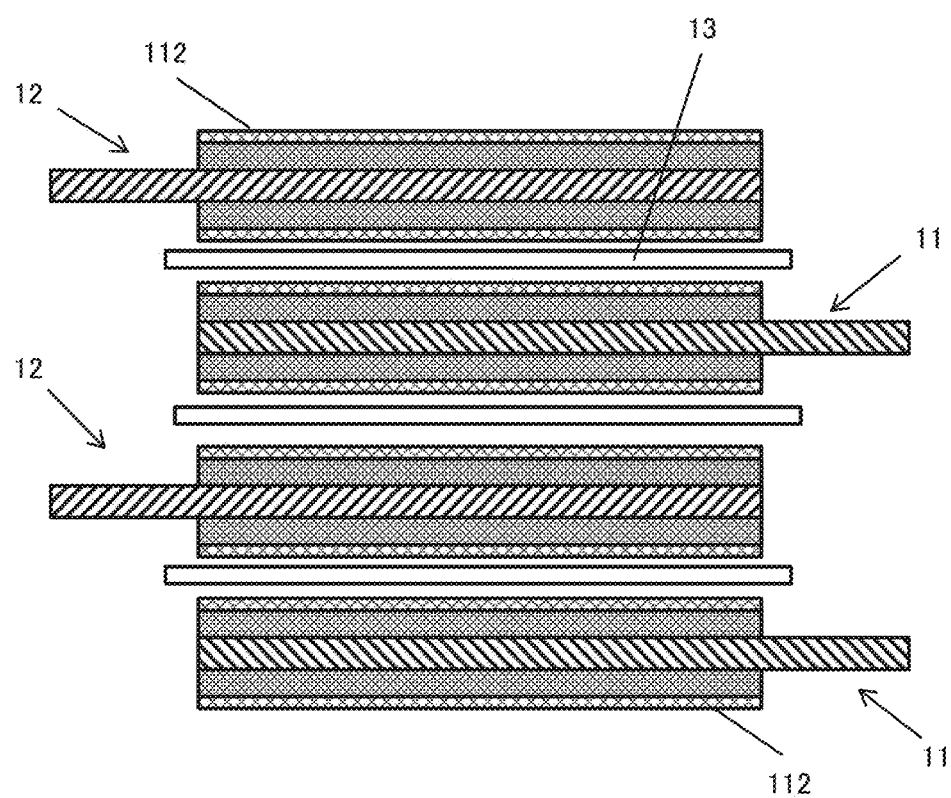
FIG. 4C is a sectional view showing another example of arrangement of the positive electrode and the negative electrode in the battery element.

Some examples of the arrangement of the positive electrode 11 and the negative electrode 12 having such a structure are shown in FIGS. 4A to 4C. In the arrangement shown in FIG. 4A, the positive electrode 11 having the insulating layer 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the arrangement shown in FIG. 4C, positive electrodes 11 having insulating layers 112 on both surfaces and negative electrodes 12 having insulating layers 112 on both surfaces are alternately laminated.

In the structures shown in FIGS. 4A to 4C, since the insulating layer 112 exists between the positive electrode 11 and the negative electrode 12, the separator 13 can be omitted. The positive electrode 11 and the negative electrode 12 are formed into a predetermined shape by punching or the like, and at this time, a large burr may occur. Therefore, when a separator is not necessary, in order to prevent a short circuit between the positive electrode 11 and the negative electrode 12 due to such large burrs, the positive electrode 11 and the negative electrode 12 preferably have insulating layers 112 on both sides.

The structure and arrangement of the positive electrode 11 and the negative electrode 12 are not limited to the above examples and various modifications are possible as long as the insulating layer 112 is provided on at least one surface of at least one of the positive electrode 11 and the negative electrode 12 and the positive electrode 11 and the negative electrode 12 are arranged such that the insulating layer 112 exists between the positive electrode 11 and the negative electrode 12 For example, in the structures shown in FIGS. 4A and 4B, the relationship between the positive electrode 11 and the negative electrode 12 can be reversed.

Since the battery element 10 having a planar laminated structure as illustrated has no portion having a small radius of curvature (a region close to a winding core of a winding structure), the battery element 10 has an advantage that it is less susceptible to the volume change of the electrode due to charging and discharging as compared with the battery element having a wound structure. That is, the battery element having a planar laminated structure is effective for an electrode assembly using an active material that is liable to cause volume expansion.

Figure 5:
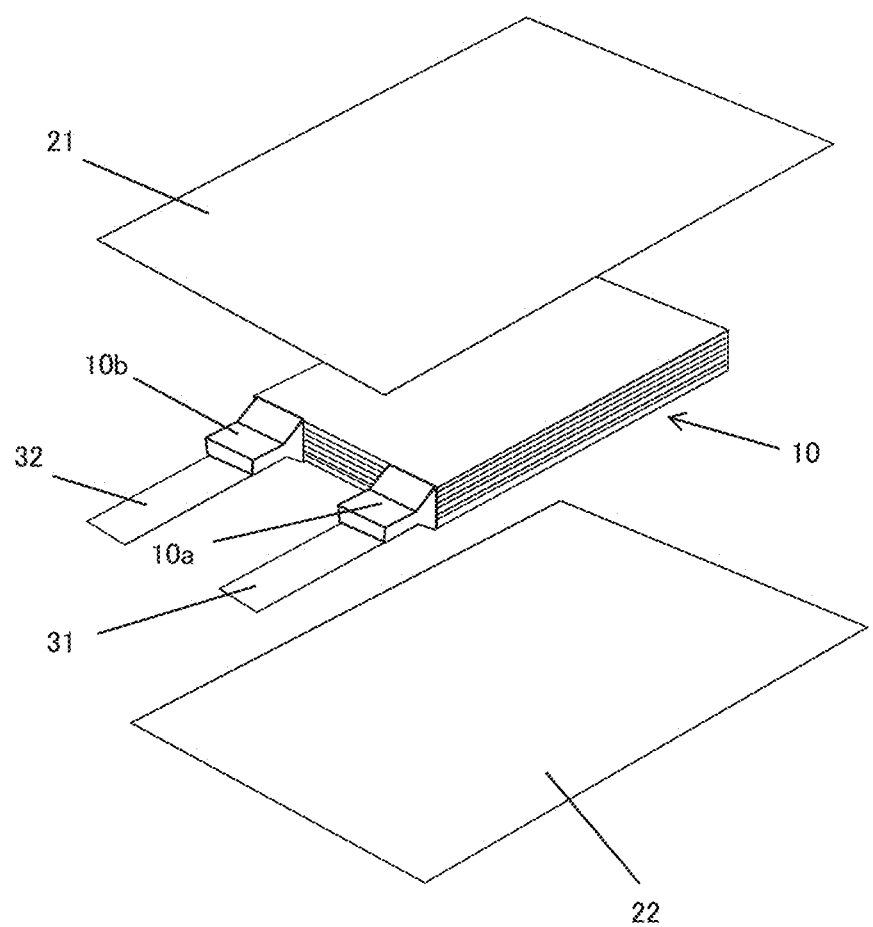
FIG. 5 is an exploded perspective view of a secondary battery according to another embodiment of the present invention.

In the embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the battery element 10. Although not shown, the positive electrode terminal 31 and the negative electrode terminal 32 may also be drawn out from two adjacent sides of the battery element 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated embodiment, the battery element 10 having a laminated structure having a plurality of positive electrodes 11 and a plurality of negative electrodes 12 is shown. However, the battery element having the winding structure may have one positive electrode 11 and one negative electrode 12.

Hereinafter, parts constituting the battery element 10 and the electrolytic solution will be described in detail. In the following description, although not particularly limited, elements in the lithium ion secondary battery will be described.

[1] Negative Electrode

The negative electrode has a structure in which, for example, a negative electrode active material is adhered to a negative electrode current collector by a negative electrode binder, and the negative electrode active material is laminated on the negative electrode current collector as a negative electrode active material layer. Any material capable of absorbing and desorbing lithium ions with charge and discharge can be used as the negative electrode active material in the present embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 μm or more, preferably 15 μm or more, and usually about 50 μm or less, preferably about 30 μm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil; petroleum heavy oil such as decomposed heavy oil (for example, ethylene heavy end) produced as a by-product upon thermal decomposition of crude oil, naphtha and the like. A solid residue obtained by distilling these heavy oil at 200 to 400° C. to result in a solid residue and then pulverizing the solid residue to a size of 1 to 100 μm can also be used as the organic substance. In addition, vinyl chloride resin, phenol resin, imide resin and the like can also be used as the organic substance.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metall elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electro-conductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to non-uniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% by mass or less, more preferably 80% by mass or less. As described above, the negative electrode active material is a material capable of reversibly absorbing and desorbing lithium ions with charge and discharge in the negative electrode, and does not include other binder and the like.

For example, the negative electrode active material layer may be formed into a sheet electrode by roll-forming the above-described negative electrode active material, or may be formed into a pellet electrode by compression molding. However, usually, the negative electrode active material layer can be formed by applying and drying an application liquid on a current collector, where the application liquid may be obtained by slurrying the above-described negative electrode active material, a binder (binding agent), and various auxiliaries contained as necessary with a solvent.

The negative electrode binder is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, acrylic acid, sodium acrylate, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance. Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.K.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one embodiment of the present invention, the positive electrode has a charge capacity per unit area of 3 mAh/cm$^2$ or more, preferably 3.5 mAh/cm$^2$ or more. From the viewpoint of safety and the like, the charge capacity per unit area of the positive electrode is preferably 15 mAh/cm$^2$ or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate (LiNiO$_2$) and a lithium nickel composite oxide obtained by partially replacing Ni of nickel lithate with another metal element, and a layered lithium nickel composite oxide represented by formula (A) below is preferable.

$$Li_y Ni_{(1-x)} M_x O_2 \quad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$ preferably $1 \leq \alpha \leq 1.2$, $\beta+\gamma+\delta=1$, $\beta \geq 0.6$ preferably $\beta \geq 0.7$, $\gamma \leq 0.2$), and, in particular, $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, for example, $LiNi_{0.8}Co_{0.05}Mn_{0.15}O_2$, $LiNi_{0.9}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0<\alpha\leq1.2$ preferably $1\leq\alpha\leq1.2$, $\beta+\gamma+\delta=1$, $0.2\leq\beta\leq0.5$, $0.1\leq\gamma\leq0.4$, $0.1\leq\delta\leq0.4$). More specific examples include $LiNi_{0.4}Co_{0.3}Mn_{0.3}O_2$ (abbreviated as NCM433), $LiNi_{1/3}Co_{1/3}Mn_{1/2}O_2$ $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

For example, the positive electrode active material layer may be formed into a sheet electrode by roll-forming the above-described positive electrode active material, or may be formed into a pellet electrode by compression molding as in the case of the negative electrode active material layer. However, usually, the positive electrode active material layer can be formed by applying and drying an application liquid on a current collector, where the application liquid may be obtained by slurrying the above-described positive electrode active material, a binder (binding agent), and various auxiliaries contained as necessary with a solvent.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

A conductive auxiliary material may be added to the positive electrode active material layer containing the positive electrode active material for the purpose of reducing impedance. Examples of the conductive auxiliary material include carbonaceous fine particles such as graphite, carbon black, and acetylene black.

[3] Insulating Layer (Material and Manufacturing Method Etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

An insulating layer slurry is a slurry composition for forming a porous insulating layer. Therefore, the "insulating layer" can also be referred to as "porous insulating layer". The insulating layer slurry comprises non-conductive particles and a binder (or a binding agent) having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which conductivity is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicon, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the non-conductive particles is not particularly limited, and may be spherical, needle-like, rod-like, spindle-shaped, plate-like, or the like.

Examples of the plate-like non-conductive particles, especially inorganic particles, preferably used include various commercially available products such as "SUNLOVELY" ($SiO_2$) manufactured by AGC Si-Tech Co., Ltd., pulverized product of "NST-B 1" (TiO$_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina (Al$_2$O$_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, SiO$_2$, Al$_2$O$_3$, and ZrO can be produced by the method disclosed in Japanese Patent Laid-Open No. 2003-206475.

When the shape of the non-conductive particles is spherical, the average particle diameter of the non-conductive particles is preferably in the range of 0.005 to 10 µm, more preferably 0.1 to 5 µm, particularly preferably 0.3 to 2 µm. When the average particle diameter of the non-conductive particles is in the above range, the dispersion state of the porous insulating layer slurry is easily controlled, so that it is easy to manufacture a porous insulating layer having a uniform and predetermined thickness. In addition, such average particle diameter provides the following advantages. The adhesion to the binder is improved, and even when the porous insulating layer is wound, it is possible to prevent the non-conductive particles from peeling off, and as a result, sufficient safety can be achieved even if the porous insulating layer is thinned. Since it is possible to suppress an increase in the particle packing ratio in the porous insulating layer, it is possible to suppress a decrease in ion conductivity in the porous insulating layer. Furthermore, the porous insulating layer can be made thin.

The average particle diametersize of the non-conductive particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the non-conductive particles is preferably 0.5 to 40%, more preferably 0.5 to 30%, particularly preferably 0.5 to 20%. By setting the particle diameter distribution of the non-conductive particles within the above range, a predetermined gap between the non-conductive particles is maintained, so that it is possible to suppress an increase in resistance due to the inhibition of movement of lithium. The particle diameter distribution (CV value) of the non-conductive particles can be determined by observing the non-conductive particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the insulating layer slurry is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto.

In addition, a binder used for binding the active material layer can also be used.

When the solvent contained in the insulating layer slurry is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described non-conductive filler and binder, if necessary. Examples of such material include various polymer materials that can function as a thickener for the insulating layer slurry, which will be described later. In particular, when an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the non-conductive filler to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the inorganic filler and the binder, for example, a thickener, the content ratio of the thickener is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, the porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

(Forming of Insulating Layer)

A method of forming the insulating layer will be described. As a material for forming the insulating layer, a paste type material (including slurry form or ink form, the same applies below) mixed and dispersed with an non-conductive filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacet-amide, or a combination of two or more thereof. The content of the solvent in the insulating layer slurry is not particularly limited, and it is preferably 50%, or less of the entire slurry, and it is preferably 30% or high.

The operation of mixing the non-conductive filler and the binder with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the insulating layer slurry, conventional general coating means can be used without restricting. For example, a predetermined amount of the insulating layer slurry can be applied by coating in a uniform thickness by means of a suitable coating device (a gravure coater, a slit coater, a die coater, a comma coater, a dip coater, etc.). When applying the slurry having a high viscosity as in the present embodiment, among these, it is preferable to use the slit coater and the die coater that extrude and apply the slurry with a pump.

Thereafter, the solvent in the insulating layer slurry may be removed by drying the coating material by means of a suitable drying means.

(Thickness)

The thickness of the insulating layer is preferably 1 μm or more and 30 μm or less, and more preferably 2 μm or more and 15 μm or less.

[4] Electrolytic Solution

The electrolytic solution includes, but are not particularly limited, a nonaqueous electrolytic solution which is stable at an operating potential of the battery. Specific examples of the nonaqueous electrolytic solution include nonprotic organic solvent such as cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinyl-ethylene carbonate (VEC); chain carbonates such as allyl-methyl carbonate (AMC), dimethyl carbonate (DMC), diethyl carbonate (DEC), ethylmethyl carbonate (EMC), dipropyl carbonate (DPC); propylene carbonate derivative; aliphatic carboxylic acid esters such as methyl formate, methyl acetate, ethyl propionate; cyclic esters such as γ-butyrolactone (GBL). The nonaqueous electrolytic solution may be used singly or a mixture of two or more kinds may be used in combination. Furthermore, sulfur-containing cyclic compound such as sulfolane, fluorinated sulfolane, propane sultone or propene sultone may be used.

Specific examples of support salt contained in the electrolytic solution include, but are not particularly limited to, lithium salt such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$. The support salt may be used singly or two or more kinds thereof may be used in combination.

[5] Separator

When the battery element 10 includes the separator 13 between the positive electrode 11 and the negative electrode 12, the separator is not particularly limited, and porous film or non-woven fabric made of such as polypropylene, polyethylene, fluorine-based resin, polyamide, polyimide, polyester, polyphenylene sulfide, polyethylene terephthalate, cellulose, as well as an article in which inorganic substance such as silica, alumina, glass is attached or bonded to a base material made of the above material and an article singly processed from the above material as non-woven fabric or cloth may be used as the separator. The thickness of the separator may be arbitrary. However, from the viewpoint of high energy density, a thin separator is preferable and the thickness can be, for example, 10 to 30 μm.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode 12 differ only in the materials, shapes, etc. to be used, and the following explanation will be made on the positive electrode 11 and the negative electrode 12.

The electrode finally has a structure in which the active material layer 111 and the insulating layer 112 are laminated in this order on the current collector 110. Such a laminated structure is manufactured by a method including a step of applying an active material layer slurry on the current collector 110, a step of applying an insulating layer slurry on the active material layer slurry before drying the active material layer slurry, and drying the active material layer slurry and the insulating layer slurry after they are applied to obtain the laminated structure in which the active material layer and the insulating layer are laminated in this order on the current collector.

Here, in the present embodiment, it is important that the insulating layer slurry (second layer slurry) has a solid content ratio of more than 50% by mass and the composition ratio of the binder (second binder) contained in the insulating layer slurry is more than 2% by mass. Here, the insulating layer slurry contains a filler such as non-conductive particles, a binder for binding the filler, and a solvent for these, and when the mass of the filler is A, the mass of the binder is B and the mass of the solvent is C,
the solid content ratio is calculated by (A+B)/(A+B+C), and the binder composition ratio is calculated by B/(A+B).

Generally, the solid content ratio of the insulating layer slurry is often reduced from the viewpoint of easy coating, since the thickness of the insulating layer is required to be smaller than that of the active material layer. However, when the solid content ratio is reduced, the amount of the solvent increases accordingly, and it takes time to dry after coating. Therefore, when the insulating layer slurry is applied before the active material layer slurry is dried, these slurries are mixed. Therefore, it is preferable to increase the solid content ratio of the insulating layer slurry. This makes it difficult to reduce the thickness of the insulating layer. However, when the insulating layer slurry is applied before the active material layer slurry is dried, the thickness of the insulating layer can be reduced because the surface of the active material layer is smooth at the time of applying the insulating layer slurry.

Therefore, as described above, since the drying time is shortened by setting the solid content ratio of the insulating layer slurry to more than 50% by mass, mixing of the active material layer slurry and the insulating layer slurry can be suppressed, and the insulating property of the surface of the active material layer can be ensured without applying the insulating layer unnecessarily thick. In addition, by setting the composition ratio of the binding agent contained in the insulating layer slurry to 2% by mass or more, the adhesion between the active material layer and the insulating layer can be improved. Therefore, a decrease in charge/discharge capacity and an increase in battery resistance of a secondary battery using the obtained electrode are suppressed.

In order to more effectively suppress the mixing of the active material layer and the insulating layer, with respect to viscosities of the active material layer slurry and the insulating layer slurry, it is preferably that the viscosity of the active material layer slurry is 12000 mPa·s or more, and/or the viscosity of the insulating layer slurry is 4000 mPa·s or more when measured at 25° C. with a shear rate of 1/sec. More preferably, the viscosity of the active material layer slurry is 50000 mPa·s or more.

If the viscosity of the active material layer slurry and the insulating layer slurry is too high, it becomes difficult to form the active material layer and the insulating layer with a uniform thickness. Moreover, if the viscosity of the slurry is too high, handling of the slurry will become difficult and the application with a coater will also become difficult. Therefore, in order to ensure the uniformity of the thickness of the active material layer and the insulating layer, and to ensure a coating property with the coater, the viscosity of the active material layer slurry and the insulating layer slurry under the above measurement condition is preferably 200,000 mPa·s or less.

The viscosity defined above is a viscosity supposing the state after the application of the active material layer slurry and the insulating layer slurry. However, if the viscosity during application is too high, the coating property of the active material layer and/or the insulating layer may be reduced. Therefore, it is preferable that the viscosity of the active material layer slurry and/or the insulating layer slurry measured at 25° C. with a shear rate of 5/sec is less than or equal to half of the viscosity measured at 25° C. with a shear rate of 1/sec. Therefore, the fluidity of the active material layer slurry and/or the insulating layer slurry during application is ensured, and efficient application is possible.

In order to more effectively suppress the mixing of the active material layer and the insulating layer, it is preferable to perform cooling at least the surface of the active material layer slurry after applying the active material layer slurry and before applying the insulating layer slurry. The cooling of the active material layer slurry as used herein means that at least the surface of the coated active material layer slurry is brought to the temperature of the coated active material layer slurry (usually, for example, normal temperature of 5 to 35° C.) or less. In a state where at least the surface of the active material layer slurry is cooled, the substantial viscosity of the surface of the active material layer slurry becomes high. By applying the insulating layer slurry on the active material layer slurry in such a state, mixing of the active material layer and the insulating layer can be more effectively suppressed. The coated active material slurry can be cooled by, for example, using a fan or the like to blow cooling air below the temperature of the active material slurry onto the surface of the coated active material slurry.

In the process of obtaining a laminated structure, it is preferable that the time from the completion of applying of the insulating layer slurry to the start of drying of the active material slurry and the insulating layer slurry is as short as possible (for example, 10 seconds or less). Also in this case, it is promoted to dry the insulating layer slurry before the active material layer slurry and the insulating layer slurry are sufficiently mixed at the interface between them as described above, and as a result, it can be suppressed to mix the active material layer slurry and the insulating layer slurry at the interface between them.

From the viewpoint of the adhesion between the active material layer and the insulating layer, it is preferable that the active material layer slurry and the insulating layer slurry have the same main component of the binder, the same main component of the solvent or the same main component of both. When at least one of the main component of the binder and the main component of the solvent of the active material layer slurry and the insulating layer slurry is the same, the adhesion between the active material layer and the insulating layer is improved.

Figure 6:
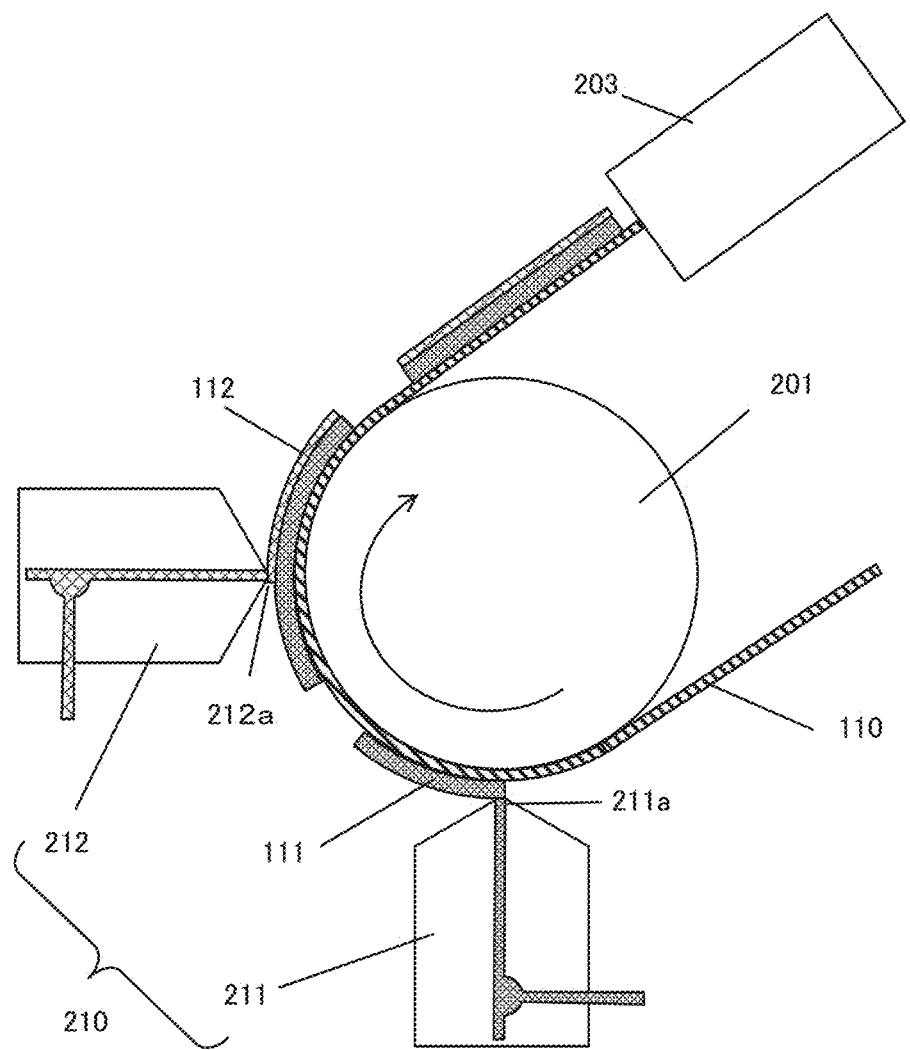
FIG. 6 is a schematic diagram of one embodiment of an electrode manufacturing apparatus for manufacturing an electrode having the structure shown in FIG. 2.

For manufacturing the electrode, for example, the manufacturing apparatus shown in FIG. 6 can be used. The manufacturing apparatus shown in FIG. 6 includes a backup roller 201, a die coater 210 and a drying machine 203.

The backup roller 201 rotates in a state in which the long current collector 110 is wound on the outer peripheral surface of the backup roller 201 whereby the current collector 110 is fed in the rotation direction of the backup roller 201 while the rear surface of the current collector 110 is supported. The die coater 210 has a first die head 211 and a second die head 212 which are spaced from each other in the radial direction and the circumferential direction of the backup roller 201 with respect to the outer circumferential surface of the backup roller 201.

The first die head 211 is for applying the active material layer 111 on the surface of the current collector 110 and is located on the upstream side of the second die head 212 with respect to the feed direction of the current collector 110. A discharge opening 211a having a width corresponding to the applying width of the active material layer 111 is opened at the tip of the first die head 211 facing the backup roller 201. The active material layer slurry is discharged from the discharger opening 211a. The active material layer slurry is prepared by dispersing particles of an active material and a binder (binding agent) in a solvent, and is supplied to the first die head 211.

The second die head 212 is for applying the insulating layer 112 on the surface of the active material layer 111 and is located on the downstream side of the first die head 211 with respect to the feed direction of the current collector 110. A discharge opening 212a having a width corresponding to the applying width of the insulating layer 112 is opened at the tip of the second die head 212 facing the backup roller 201. The insulating layer slurry is discharged from the discharge opening 212a. The insulating layer slurry is prepared by dispersing non-conductive particles and a binder (binding agent) in a solvent, and is supplied to the second die head 212.

A solvent is used for preparing the active material layer slurry and the insulating layer slurry. When N-methyl-2-pyrrolidone (NMP) is used as the solvent, peeling strength of the layer obtained by evaporating the solvent can be increased compared with the case of using an aqueous solvent. When N-methyl-2-pyrrolidone was used as a solvent, the solvent did not evaporate completely even if the solvent was evaporated in a subsequent step, and the obtained layer contains a slight amount of N-methyl-2-pyrrolidone.

The drying machine 203 is for evaporating the solvent from the active material layer slurry and the insulating layer slurry respectively discharged from the first die head 211 and the second die head 212. The slurries are dried by the evaporation of the solvent, whereby the active material layer 111 and an insulating layer 112 are formed.

Next, a manufacturing process of the electrode by means of the manufacturing apparatus shown in FIG. 6 will be described. For convenience of explanation, the active material layer slurry and the active material layer obtained therefrom are described as "active material layer 111" without distinguishing between them. Actually, the "active material layer 111" before drying means the active material layer slurry. Similarly, the "insulating layer 112" before drying means the insulating layer slurry.

Figure 6A:
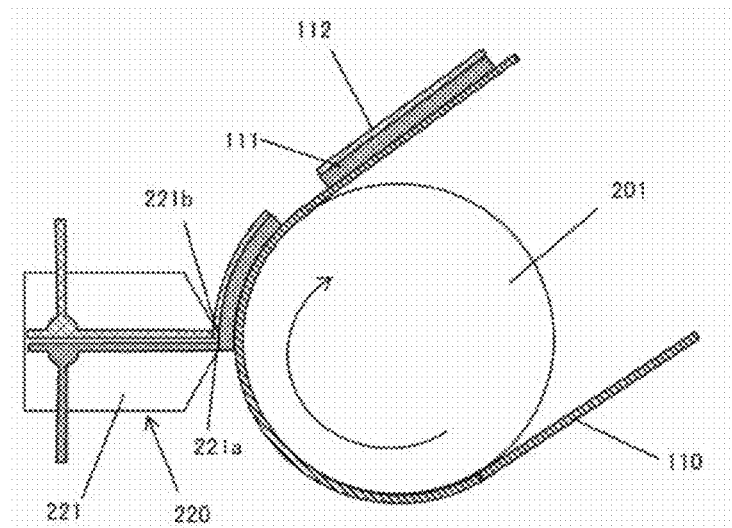
FIG. 6A is a schematic diagram of another embodiment of the electrode manufacturing apparatus.

First, the active material layer 111 slurried with a solvent is intermittently applied to the surface of the long current collector 110 supported and fed on the backup roller 201 by using the first die head 211. As a result, as shown in FIG. 6A, a slurry of the active material layer 111 is applied to the current collector 110 at intervals in the feeding direction A of the current collector 110. By intermittently applying the active material layer 111 with the first die head 211, the active material layer 111 is applied in a rectangular shape having a longitudinal length parallel to the feeding direction A of the current collector 110 and a lateral length along a direction orthogonal thereto.

Next, when the leading end of the applied active material layer 111 in the feeding direction of the current collector 110 is fed to a position facing the discharge opening 212a of the second die head 212, the insulating layer 112 slurried with solvent is intermittently applied to the active material layer 111 by using the second die head 212. The insulating layer 112 is applied before the active material layer 111 is dried, that is, before the solvent of the active material layer 111 is evaporated. By intermittently applying the insulating layer 112 with the second die head 212, the insulating layer 112 is applied in a rectangular shape having a longitudinal length parallel to the feeding direction A of the current collector 110 and a lateral length along a direction perpendicular thereto.

In the present embodiment, the first die head 211 and the second die head 212 have the same width (the dimension in the direction orthogonal to the feeding direction A of the current collector 110) of the discharge openings 211a and 212a, and the active material layer 111 and the insulating layer 112 have the same applying width.

After applying the active material layer 111 and the insulating layer 112, the current collector 110 is fed to the drying machine 203, the solvents of the active material layer slurry and the insulating layer slurry are evaporated in the drying machine 203. Thus, the flurry for the active material layer and the insulating layer slurry are dried. After evaporation of the solvent, the current collector 110 is fed to a roll press where the active material layer 111 and the insulating layer 112 are compression-molded. Thus, the active material layer 111 is formed simultaneously with the formation of the insulating layer 112.

Finally, the current collector 110 is cut into a desired shape by an appropriate method such as punching. The electrode is thereby obtained. The cutting step may be carried out so as to obtain a desired shape by one time of processing or it may be carried out so as to obtain a desired shape by a plurality of times of processing.

Although the present invention has been described with reference to one embodiment, the present invention is not limited to the above-described embodiments, and can be arbitrarily changed within the scope of the technical idea of the present invention.

For example, in the above embodiment, in order to apply the active material layer 111 and the insulating layer 112, a die coater 210 having two die heads 211 and 212 with discharge openings 211a and 212a as shown in FIG. 6 was used. However, as shown in FIG. 6A, the active material layer 111 and the insulating layer 112 can be applied to the current collector 110 by using a die coater 220 having a single die head 221 with two discharge openings 221a and 221b.

The two discharge openings 221a and 221b are arranged at intervals in the rotation direction of the backup roller 201, that is, the feed direction of the current collector 110. The active material layer slurry is applied by the discharge opening 221a located on the upstream side in the feed direction of the current collector 110 and the insulating layer slurry is applied by the discharge opening 221b located on the downstream side. Therefore, the active material layer slurry and the insulating layer slurry are discharged respectively from the two discharge openings 221a and 221b, thereby it is possible to obtain a structure that the active material layer 111 is intermittently applied to the surface of the current collector 110 and the insulating layer 112 is applied to the surface of the active material layer 111.

Figure 6B:
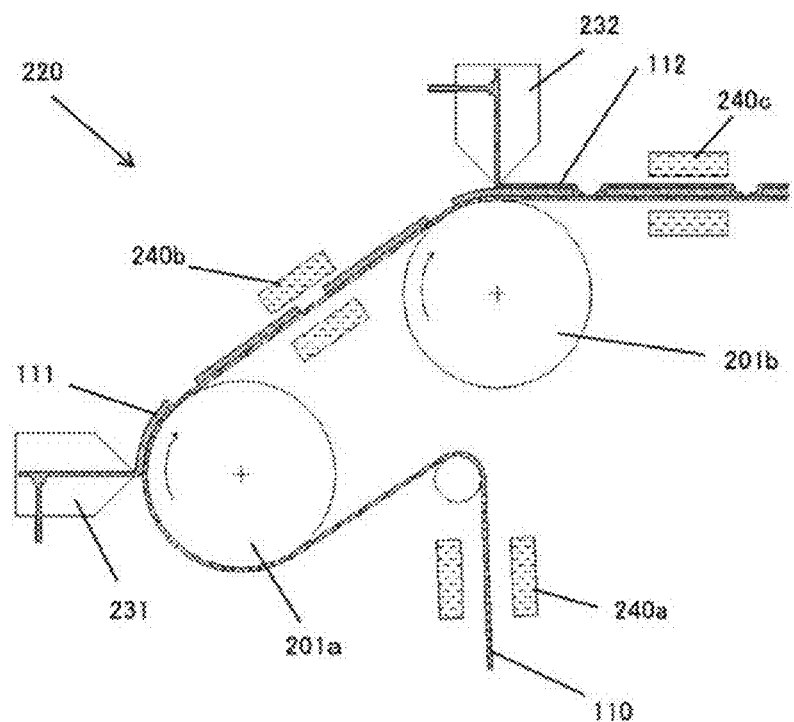
FIG. 6B is a schematic diagram of another embodiment of the electrode manufacturing apparatus.

As still another embodiment of the die coater, a die coater 220 shown in FIG. 6B can also be used. The die coater 220 shown in FIG. 6B has a first backup roller 201a and a second backup roller 201b, and a first die head 231 and a second die head 232 are arranged corresponding to each of them. The active material layer 111 is applied by the first die head 231 located on the upstream side of the transport direction of the current collector 110, and the insulating layer 112 is applied by the second die head 232 located on the downstream side. Even with such a configuration, it can be obtained a structure in which the active material layer 111 is intermittently applied to the surface of the current collector 110 and the insulating layer 112 is applied to the surface of the active material layer 111.

When the die coater 220 having a plurality of backup rollers 201a and 201b as shown in FIG. 6B is used, it can be arranged a first sensor 240a located upstream of the first backup roller 201a, a second sensor 240b between the first backup roller 201a and the second backup roller 201b and a third sensor 240c located downstream of the second backup roller 201b. These sensors 240a, 240b, and 240c can be film thickness meters, for example, and thereby the thickness of the active material layer 111 and the thickness of the insulating layer 112 can be measured. The thickness of the active material layer 111 can be obtained from the difference between the measurement result by the second sensor 240b and the measurement result by the first sensor 240a, and the thickness of the insulating layer 112 can be obtained from the difference between the measurement result obtained by the third sensor 240c and the measurement result obtained by the second sensor 240b.

As the film thickness meter, a known film thickness meter such as a radiation ($\alpha$-ray, $\gamma$-ray, X-ray) film thickness meter and a laser film thickness meter can be used. The film thickness meter is desirably a non-contact type. In addition, either a reflection type or a transmission type can be used as the film thickness meter.

Furthermore, in the above embodiment, the case where the active material layer 111 and the insulating layer 112 are applied to one side of the current collector 110 has been described. However, it is possible to manufacture an electrode having the active material layer 111 and the insulating layer 112 on both surface of the current collector 110 by applying the active material layer 111 and the insulating layer 112 on the other side of the current collector 110 in a similar manner. After the active material layer 111 and the insulating layer 112 are formed on both surfaces of the current collector 110, the current collector 110 is fed to a roll press machine, where the active material layer 111 and the insulating layer 112 are compressed.

In the above embodiment, the case where the first layer is the active material layer and the second layer is the insulating layer has been described for the electrode and the manufacturing method thereof. However, the combination of the first layer and the second layer is not limited.

For example, the first layer can be a high adhesion active material layer in which the amount of the binder is increased than usual, and the second layer can be a high energy density active material layer. With such a layer structure, it is possible to improve the energy density of the battery while suppressing the falling off of the active material layer from the current collector. When the first layer is a low-resistance active material layer in which the amount of the conductive material is increased than usual, or a conductive layer made of a conductive material and a binder, and the second layer is a high energy density active material layer, both the energy density and the charge/discharge output density of the battery can be improved.

Further, the battery obtained by the present invention can be used in various uses. Some examples are described below.

Battery Pack

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

Vehicle

Figure 7:
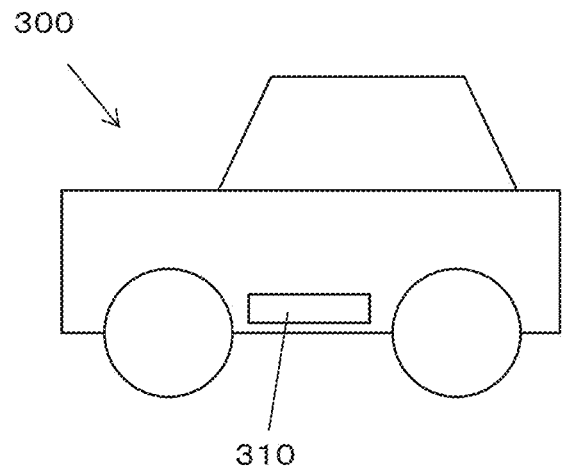
FIG. 7 is a schematic view showing an embodiment of an electric vehicle equipped with a secondary battery.

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present embodiment is not limited to an automobile, and the battery can also be used as various power sources for other vehicles, for example, transportations such as electric trains. As an example of such a vehicle, FIG. 7 shows a schematic diagram of an electric vehicle. The electric vehicle 300 shown in FIG. 7 has a battery pack 310 configured to satisfy the required voltage and capacity by connecting a plurality of the above-described batteries in series and in parallel.

Power Storage Device

Figure 8:
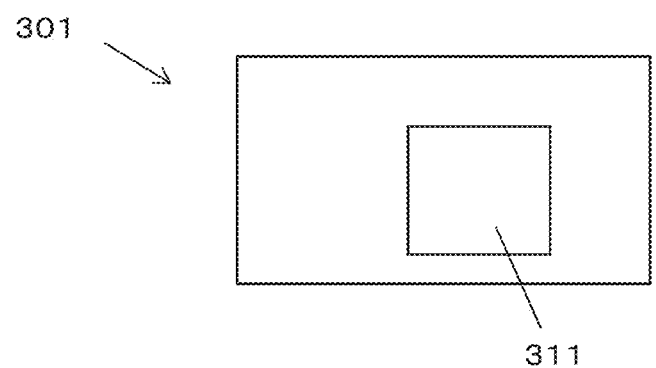
FIG. 8 is a schematic diagram showing an example of a power storage device equipped with a secondary battery.

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 8. The power storage device 301 shown in FIG. 8 has a battery pack 311 configured to satisfy a required voltage and capacity by connecting a plurality of the above-described batteries in series and in parallel.

Others

Furthermore, the above-described battery or the battery pack thereof can be used as a power source of a mobile device such as a mobile phone, a notebook computer and the like.

EXPERIMENTAL EXAMPLES

Experimental Example 1 (Positive Electrode)

A plurality of simulated positive electrodes, in each of which a positive electrode active material layer is formed as a first layer on a current collector and an insulating layer is formed as a second layer on the first layer, were produced under several conditions where the type and composition ratio represented by the mass ratio of the binder (second binder) used for each insulating layer was different. The slurry contains filler (for example, an active material in the active material layer slurry, non-conductive particles in the insulating layer slurry, etc.), a binder and a solvent. When the mass of the filler is A, the mass of the binder is B, and the mass of the solvent is C, the solid content ratio of the slurry and the composition ratio of the binder are calculated by the following formulas:

Solid content ratio of slurry=$(A+B)/(A+B+C)$,

Binder composition ratio=$B/(A+B)$.

Preparation of Positive Electrode Active Material Layer Slurry

As a positive electrode material, Lithium nickel composite oxide ($LiNi_{0.80} Mn_{0.15} Co_{0.05} O_2$), carbon black as a conductive auxiliary, and polyvinylidene fluoride (PVdF, weight average molecular weight is 1,000,000) as a binder (first binder) were weighed at a mass ratio of 90:5:5 (composition ratio of the thickener was 3% by mass), and they were kneaded using N-methyl pyrrolidone as a solvent to obtain positive electrode active material layer slurries. The solvent was added so that the solid content ratio of the positive electrode active material layer slurry was about 70% by mass.

Preparation of Insulating Layer Slurry

Alumina (AKP-3000 manufactured by Sumitomo Chemical Co., Ltd.) as non-conductive particles and polyvinylidene fluoride (PVdF) as a binder (second binder) are weighed at a predetermined mass ratio, and these were kneaded using N-methylpyrrolidone as a solvent to obtain an insulating layer slurry. Here, as a second binder, three kinds of binders having different weight average molecular weights, were used, the composition ratio of the binder and the solid content ratio of the slurry were changed for each binder, and a total of 18 types of insulating layer slurries 1 to 18 were prepared. The viscosities of the obtained insulating layer slurries 1 to 18 were measured. The viscosities are those measured at a temperature of 25° C. and a shear rate of 1 (/sec), and a rotational viscometer DV-II+Pro supplied from BROOK FIELD was used for viscosity measurement.

Preparation of Simulated Positive Electrode

An aluminum foil having a thickness of 20 μm was prepared as a current collector. The positive electrode active material layer slurry is applied on the aluminum foil, the insulating layer slurry is applied on the positive electrode active material layer slurry before the positive electrode active material layer slurry is dried, and they were dried to prepare a plurality of simulated positive electrode. The preparation of the simulated positive electrodes was performed on the above-mentioned insulating layer slurries 1 to 18. Therefore, in Experimental Example 1, 18 types of simulated positive electrodes 1 to 18 were prepared.

A two-head die coater having two die heads was used for applying the positive electrode active material layer slurry and the insulating layer slurry. The applying amount of the positive electrode active material layer slurry was 10 mg/cm². The applying amount of the insulating layer slurry was 2 mg/cm².

Evaluation

The following evaluations were performed on the prepared simulated positive electrodes 1 to 18.

(Cracks on the Insulating Layer Surface)
When the surface of the insulating layer is cracked, the insulating property is reduced depending on the depth and extent of the crack. Therefore, the presence or absence of cracks on the surface of the insulating layer was visually observed. If no cracks were found, the rating was "A", and if it was found, the rating was "C".

(Adhesive Strength of Insulating Layer)
If the adhesive strength between the active material layer and the insulating layer is too weak, a short circuit between the positive electrode and the negative electrode due to peeling of the insulating layer from the active material layer may be caused. Therefore, the adhesive strength of the insulating layer was evaluated by wrapping the prepared simulated positive electrode around a metal rod having a diameter of 2 mm and scraping it three times to determine whether the coating film was cracked or peeled off. Specifically, when no cracking or peeling off of the coating film occurs at all, it was evaluated as "A", when a crack or peeling off occurs partially in the coating film, it was evaluated as "B", and when cracks or peeling off occurred, it was evaluated as "C".

(Insulation Rate)
The insulation rate of each of the prepared simulated positive electrodes was evaluated. The insulation ratio was checked by the presence or absence of conduction between the lowermost aluminum foil and the surface of the uppermost insulating layer with a tester for each of the simulated positive electrodes at 20 locations, and defined as a value representing the ratio of the number of locations where there was no conduction in percentage. It can be said that the higher the insulation rate, the more reliable the insulation by the insulating layer is achieved, and conversely, the lower the insulation rate, the more the internal short circuit occurs. When cracks were visually observed in the insulating layer, the presence or absence of conduction was checked at 20 locations excluding the cracked portion.

Table 1 shows the main constitutions of the insulating layer slurry used for the preparation of the simulated positive electrodes 1 to 18 and the evaluation results of the prepared simulated positive electrodes.

TABLE 1

| Simulated Positive Electrode | Weight-average Molecular Weight of Second Binder (×10²) | Binder Composition Ratio (mass %) | Solid Content Ratio (mass %) | Viscosity (×10⁴ mPa·s) | Surface Cracks | Adhesive Strength | Insulation Rate (%) |
|---|---|---|---|---|---|---|---|
| 1 | 35 | 2 | 71 | 12 | A | B | 100 |
| 2 | 35 | 3 | 69 | 17 | A | A | 100 |
| 3 | 35 | 5 | 65 | 14 | A | A | 100 |
| 4 | 35 | 10 | 63 | 14 | A | A | 100 |
| 5 | 35 | 10 | 60 | 4 | A | A | 100 |
| 6 | 35 | 10 | 48 | 0.1 | A | A | 0 |
| 7 | 63 | 1.5 | 70 | 13 | A | B | 100 |
| 8 | 63 | 3 | 67 | 8 | A | A | 100 |
| 9 | 63 | 5 | 65 | 10 | A | A | 100 |
| 10 | 63 | 10 | 61 | 9 | A | A | 100 |
| 11 | 63 | 10 | 59 | 5 | A | A | 100 |
| 12 | 63 | 10 | 48 | 0.2 | A | A | 10 |
| 13 | 100 | 1 | 56 | 3 | C | A | 100 |
| 14 | 100 | 3 | 50 | 10 | C | A | 100 |
| 15 | 100 | 5 | 45 | 8 | A | A | 90 |
| 16 | 100 | 10 | 31 | 1 | A | A | 70 |
| 17 | 100 | 10 | 29 | 0.4 | A | A | 40 |
| 18 (reference) | 100 | 10 | 23 | 0.1 | A | A | 0 |
| (Positive Electrode Active Material Layer Slurry) | | | | | | | |
| Positive Electrode Active Material Lever | 63 | 3 | 70 | | | | |

Table 1 shows the followings.

(1) The larger the weight-average molecular weight of the second binder and the smaller the binder composition ratio, the more the surface of the insulating layer tends to crack. This is considered to be caused by the fact that the solid content ratio in the slurry had to be reduced since the fluidity of the insulating layer slurry was lowered due to the large weight-average molecular weight of the second binder, and as a result, the amount of shrinkage when the insulating slurry dries has increased in order to ensure fluidity, and the bonding force becomes relatively insufficient due to the relatively small amount of the second binder. From this viewpoint, it is more preferable that the weight-average molecular weight of the second binder be 630,000 or less.

(2) When the weight average molecular weight of the second binder is small, the adhesive strength tends to decrease when the binder composition ratio is small.

(3) By setting the solid content ratio in the insulating layer slurry to be more than 50% by mass and the composition ratio of the binder to be more than 2% by mass, the adhesion and the insulating rate were good. Further, by setting the solid content ratio to be 59% by mass or more, cracks were eliminated and the condition was improved.

FURTHER EXEMPLARY EMBODIMENTS

The present invention has been described in detail above. The present specification discloses the inventions described in the following further exemplary embodiments. However, the disclosure of the present specification is not limited to the following further exemplary embodiments.

Further Exemplary Embodiment 1

A method for manufacturing an electrode used as a positive electrode and a negative electrode of a secondary battery comprising:

applying a first layer slurry containing a first binder to a surface of a current collector, applying a second layer slurry containing a second binder on the first layer slurry before the first layer slurry is dried, and drying the first layer slurry and the second layer slurry after applying the first layer slurry and the second layer slurry to obtain a laminated structure in which a first layer and a second layer are laminated in this order on the current collector, wherein the second layer slurry has a solid content ratio of more than 50% by mass and a composition ratio of the second binder of more than 2% by mass.

Further Exemplary Embodiment 2

The method for manufacturing the electrode for the secondary battery according to Further exemplary embodiment 1, wherein the second layer slurry has the solid content ratio of 59% by mass or more.

Further Exemplary Embodiment 3

The method for manufacturing the electrode for the secondary battery according to Further exemplary embodiment 1, wherein a viscosity of the first layer slurry is 12000 mPa·s or more, and/or a viscosity of the second layer slurry is 4000 mPa·s or more when the viscosities of the first layer slurry and the second layer slurry are measured at 25° C. with a shear rate of 1/sec.

Further Exemplary Embodiment 4

The method for manufacturing the electrode for the secondary battery according to anyone of Further exemplary embodiments 1 to 3, wherein the viscosity of the second layer slurry is 4000 mPa·s or more and the viscosity of the first layer slurry is 5000 mPa·s or more.

Further Exemplary Embodiment 5

The method for manufacturing the electrode for the secondary battery according to Further exemplary embodiment 3 or 4, wherein the viscosity of the first layer slurry and the second layer slurry is 50000 mPa·s or more and 200000 mPa·s or less.

Further Exemplary Embodiment 6

The method for manufacturing the electrode for the secondary battery according to anyone of Further exemplary embodiments 1 to 5, wherein a viscosity of the first layer slurry and/or the second layer slurry measured at 25° C. with a shear rate of 5/sec is less than half of the viscosity measured at 25° C. with the shear rate of 1/sec.

Further Exemplary Embodiment 7

The method for manufacturing the electrode for the secondary battery according to anyone of Further exemplary embodiments 1 to 6, wherein the first layer is an active material layer and the second layer is an insulating layer.

Further Exemplary Embodiment 8

The method for manufacturing the electrode for the secondary battery according to anyone of Further exemplary embodiments 1 to 6, wherein the first layer is a high adhesion active material layer, a low-resistance active material layer or a conductive layer.

Further Exemplary Embodiment 9

The method for manufacturing the electrode for the secondary battery according to anyone of Further exemplary embodiments 1 to 8, wherein the first layer slurry and the second layer slurry include a main material, a binder and a solvent.

Further Exemplary Embodiment 10

The method for manufacturing the electrode for the secondary battery according to Further exemplary embodiment 9, wherein the first layer slurry and the second layer slurry have same main component of the binder.

Further Exemplary Embodiment 11

The method for manufacturing the electrode for the secondary battery according to Further exemplary embodiment 9 or 10, wherein the first layer slurry and the second layer slurry have same main component of the solvent.

Further Exemplary Embodiment 12

The method for manufacturing the electrode for the secondary battery according to anyone of Further exemplary embodiments 1 to 11, further comprising:

cooling at least a surface of the first layer slurry after applying the first layer slurry and before applying the second layer slurry.

Further Exemplary Embodiment 13

The method for manufacturing the electrode for the secondary battery according to anyone of Further exemplary embodiments 1 to 12, wherein in the step of obtaining the laminated structure, a time from completion of applying of the second layer slurry to start of drying of the first layer slurry and the second layer slurry is within 10 seconds.

Further Exemplary Embodiment 14

A method for manufacturing a second battery comprising:
manufacturing a positive electrode and a negative electrode by the method for manufacturing according to anyone of Further exemplary embodiments 1 to 13,
arranging the positive electrode and the negative electrode facing each other to configure a battery element, and
enclosing the battery element together with an electrolytic solution in a casing.

INDUSTRIAL APPLICABILITY

The secondary battery according to the present invention can be used for all industrial fields requiring power sources and industrial fields related to transportation, storage and supply of electrical energy. More specifically, the battery according to the present invention can be used for power sources for mobile devices such as cellular phone, notebook personal computer; power sources for electric vehicles including electric car, hybrid car, electric motorcycle, power assist bicycle, and transfer/transportation media of trains, satellites and submarines; backup power sources for UPS or the like; electric storage facilities for storing electric power generated by photovoltaic power generation, wind power generation or the like.

EXPLANATION OF SYMBOLS

10 Battery element
10a Positive electrode tab
10b Negative electrode tab
11 Positive electrode
12 Negative electrode
13 Separator
31 Positive electrode terminal
32 Negative electrode terminal
110 Current collector
110a Extended portion
111 Active material layer
112 Insulating layer

The invention claimed is:

1. A method for manufacturing an electrode used as a positive electrode and a negative electrode of a secondary battery comprising:
applying a first layer slurry containing a first binder to a surface of a current collector,
applying a second layer slurry containing a second binder on the first layer slurry before the first layer slurry is dried, and
drying the first layer slurry and the second layer slurry after applying the first layer slurry and the second layer slurry to obtain a laminated structure in which a first layer and a second layer are laminated in this order on the current collector,
wherein the second layer slurry has a solid content ratio of more than 50% by mass and a composition ratio of the second binder of more than 2% by mass, and
wherein the first layer slurry is an active material layer slurry, the second layer slurry is an insulating layer slurry, the first layer is an active material layer, and the second layer is an insulating layer.

2. The method for manufacturing the electrode for the secondary battery according to claim 1, wherein the second layer slurry has the solid content ratio of 59% by mass or more.

3. The method for manufacturing the electrode for the secondary battery according to claim 1, wherein a viscosity of the first layer slurry is 12000 mPa·s or more, and/or a viscosity of the second layer slurry is 4000 mPa·s or more when the viscosities of the first layer slurry and the second layer slurry are measured at 25° C. with a shear rate of 1/sec.

4. The method for manufacturing the electrode for the secondary battery according to claim 1, wherein the viscosity of the second layer slurry is 4000 mPa·s or more and the viscosity of the first layer slurry is 5000 mPa·s or more.

5. The method for manufacturing the electrode for the secondary battery according to claim 3, wherein the viscosity of the first layer slurry and the second layer slurry is 50000 mPa·s or more and 200000 mPa·s or less.

6. The method for manufacturing the electrode for the secondary battery according to claim 1, wherein a viscosity of the first layer slurry and/or the second layer slurry measured at 25° C. with a shear rate of 5/sec is less than half of the viscosity measured at 25° C. with the shear rate of 1/sec.

7. The method for manufacturing the electrode for the secondary battery according to claim 1, wherein the first layer slurry includes an active material, a binder and a solvent, and the second layer slurry includes a main material, non-conductive particles, a binder and a solvent.

8. The method for manufacturing the electrode for the secondary battery according to claim 7, wherein the first layer slurry and the second layer slurry have same main component of the binder.

9. The method for manufacturing the electrode for the secondary battery according to claim 7, wherein the first layer slurry and the second layer slurry have same main component of the solvent.

10. The method for manufacturing the electrode for the secondary battery according to claim 1, further comprising:
cooling at least a surface of the first layer slurry after applying the first layer slurry and before applying the second layer slurry.

11. The method for manufacturing the electrode for the secondary battery according to claim 1, wherein in the step of obtaining the laminated structure, a time from completion of applying of the second layer slurry to start of drying of the first layer slurry and the second layer slurry is within 10 seconds.

12. A method for manufacturing a second battery comprising:
manufacturing a positive electrode and a negative electrode by the method for manufacturing according to claim 1,
arranging the positive electrode and the negative electrode facing each other to configure a battery element, and
enclosing the battery element together with an electrolytic solution in a casing.

* * * * *